United States Patent [19]
Griffen

[11] Patent Number: 4,804,052
[45] Date of Patent: Feb. 14, 1989

[54] COMPENSATED MULTIPLE LOAD CELL SCALE

[75] Inventor: Neil C. Griffen, Westerville, Ohio

[73] Assignee: Toledo Scale Corporation, Worthington, Ohio

[21] Appl. No.: 126,271

[22] Filed: Nov. 30, 1987

[51] Int. Cl.$^4$ ............... G01G 19/40; G01G 19/52; G01L 25/00

[52] U.S. Cl. ............... 177/25.14; 177/50; 73/1 B

[58] Field of Search ............... 177/25.14, 211, 134, 177/255, 163, 50; 73/1 B

[56] References Cited

U.S. PATENT DOCUMENTS

| | | | |
|---|---|---|---|
| 4,049,069 | 9/1977 | Tamamura et al. | 177/134 |
| 4,261,195 | 4/1981 | Lockery . | |
| 4,368,792 | 1/1983 | Ottle | 177/255 X |
| 4,401,173 | 8/1983 | Komato | 177/211 X |
| 4,416,342 | 11/1983 | Snead | 177/163 |
| 4,556,115 | 12/1985 | Lockery et al. . | |
| 4,574,899 | 3/1986 | Griffen | 177/211 |
| 4,738,324 | 4/1988 | Borchard | 177/25.14 |

OTHER PUBLICATIONS

"Smart" Pressure Transducer Simplifies, Upgrades Control Systems–Design News, 11/3/86 pp. 86–89.

Primary Examiner—George H. Miller, Jr.

[57] ABSTRACT

Multiple digital load cells forming one or more weighing scales are connected together and to a common master controller in a local area network. The digital load cells are polled by and provide weight readings to the master controller. The weight readings are combined with a load position correction factor for each load cell and summed to provide a weight indication corrected for load position. The values of the load position correction factors are determined during set up of the scale and stored at the master controller. An individual load cell can be diagnosed remotely and replaced if defective. A new load position correction factor is determined and stored for a replacement load cell.

17 Claims, 16 Drawing Sheets

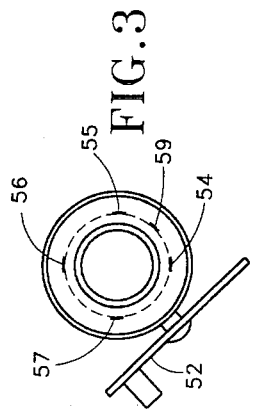
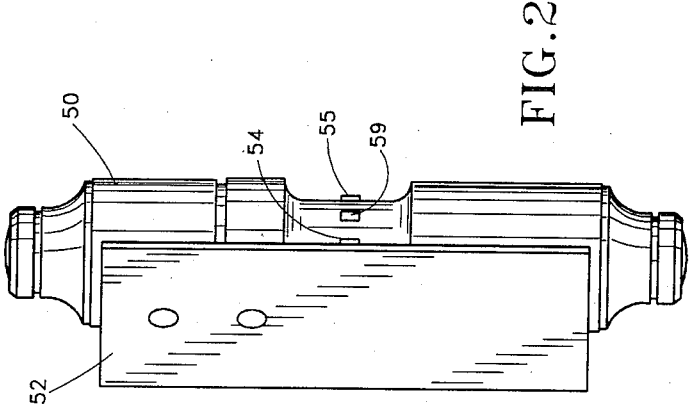
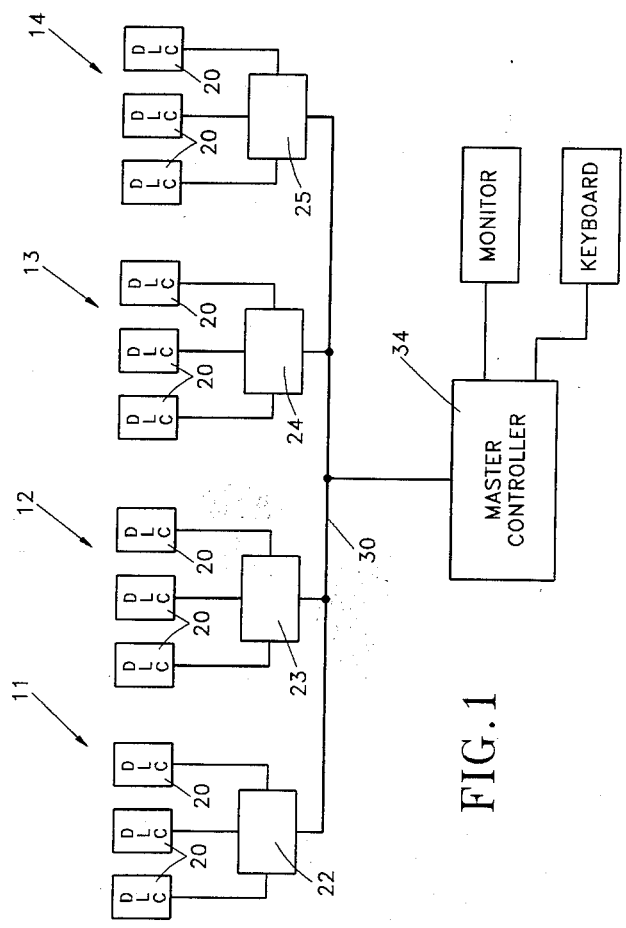

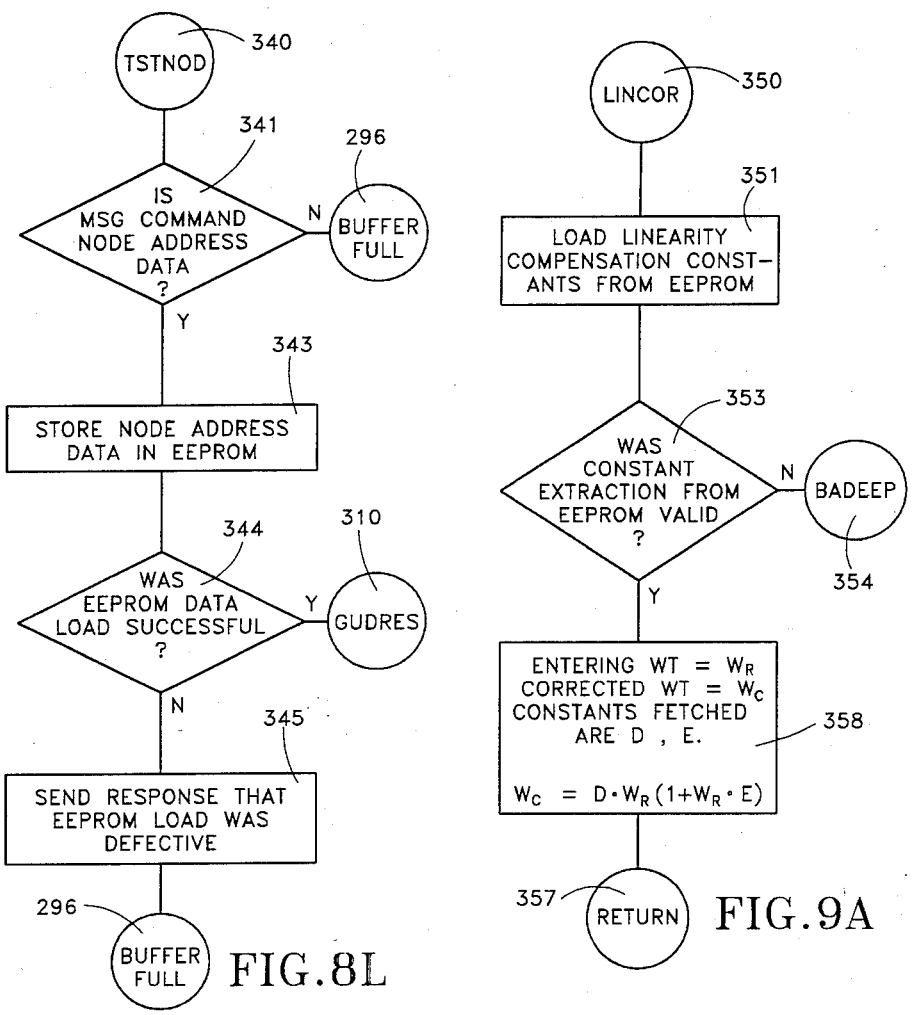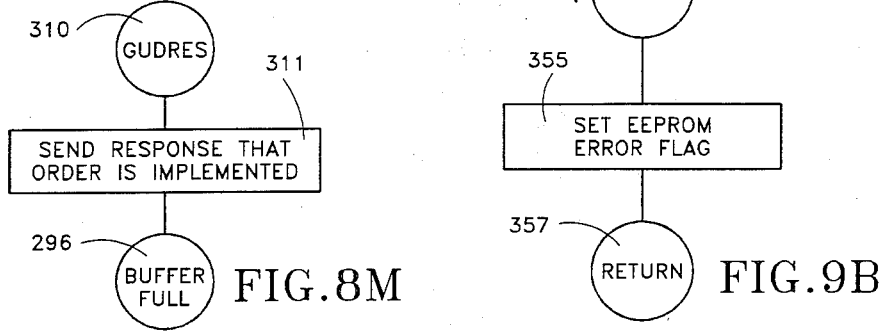

COMPENSATED MULTIPLE LOAD CELL SCALE

BACKGROUND ART

This invention relates to weighing apparatus and more particularly to weighing apparatus utilizing multiple load cells.

Many weighing applications require the use of multiple load cells in a single scale or in a number of associated scales. For example, a heavy capacity scale for weighing truck or railroad cars requires multiple load cells. Each load cell provides an analog signal proportional to the portion of the load borne by that load cell. Strain gages connected in a wheatstone bridge configuration often provide the analog signal. In heavy capacity applications the load is distributed over usually at least four load cells and some applications may require sixteen or more load cells. The sum of the load cell output signals must be obtained to provide a signal representative of the total load. The usual technique for summing the signals from the analog cells has been to connect the outputs in parallel to provide a single analog output signal representative of the total weight applied to the scale.

The weighing accuracy of multiple load cell scales depends not only on the accuracy of the individual cells but also on the mechanical and electrical interaction among them. Since the load cells usually have different sensitivities to applied loads the total scale output is usually dependent upon the position of the weight on the scale. The outputs of the individual cells must, therefore, be compensated or adjusted so that the total scale output remains substantially the same for a given load no matter where on the scale it is positioned. Such load position compensation has usually been accomplished by connecting sensitivity reducing resistors in the wheatstone bridge circuit of the individual load cells, usually across the output of the bridge circuit. U.S. Pat. Nos. 4,261,195, to Lockery, 4,574,899 to Griffen and 4,556,115 to Lockery address the problem of load position compensation in multi-load cell scales.

Despite the solutions to the load position problem proposed in the above-identified patents, there remain problems associated with the connection of multiple analog load cells in parallel. The load cells when electrically connected together are interactive, so that a load cell will perform differently when tested alone than when tested with other load cells in a scale. The interactivity of the load cells connected together substantially complicates the problem of load position compensation by connection of resistors to individual load cells. A large number of iterations or repetitions may be required to arrive at the proper value of compensating resistor because a value initially determined to be appropriate for a particular load cell must be adjusted when compensating resistors are connected to other load cells. That adjustment can then require adjustment of the other compensating resistors, and so on.

When the analog circuits of load cells are connected together they are essentially impossible to monitor individually. Thus, "trouble shooting" or repair of a scale can require disassembly of the electrical circuits in order to test the load cells individually and find the defective one. Further, when a load cell is replaced for any reason the scale often requires recompensation for load position. A known test weight is required to accomplish this recompensation. For large scales in particular this is a time consuming procedure and the known weight often inconvenient to obtain.

Recently there has appeared the so-called "digital load cell" in which an analog-to-digital converter and microprocessor are dedicated to a single load cell. The electronic circuits are mounted on a printed circuit board connected directly to the load responsive spring element, or counterforce, of the load cell. Temperature, creep and linearity errors of the individual load cell have been compensated by digital techniques.

SUMMARY OF THE INVENTION

It is a general object of the present invention to substantially eliminate the problems described above associated with connecting together the analog electrical portions of multiple load cells. A more particular object is to provide compensation for load position and other errors in multiple load cell scales in which the analog portions of the load cells remain isolated.

According to the present invention, multiple load cells associated so as to form one or more scales are connected to one or more analog-to-digital (A/D) converters to obtain a digital representation of the load on each load cell. The digital weight representations are provided to a common master controller. The master controller applies predetermined corrections to the data to produce weight readings corrected for load position. The corrections to be applied are determined by placing a load at different positions on the scale, determining the responses of the load cells to the load and positions and utilizing the responses to determine the corrections.

Preferably, each load cell is a digital load cell which includes a dedicated A/D converter and microcomputer and is connected in a local area network with the other load cells and the master controller. Each associated load cell under control of its own microcomputer and the master controller obtains digital weight readings of the load on the individual load cell and stores the data in memory associated with its own microcomputer. The master controller polls the associated load cells, and receives weight data from them.

The connection of the load cell to provide digital weight data eliminates the problems enountered when connecting together the analog electrical portions of load cells. Because the load cells are not interactive, load position compensation can be achieved in a single, rather than iterative procedure. Also, compensation can be achieved without the need for a test weight of known value.

Data can be obtained from individual load cells, so that each can be diagnosed and replaced if necessary without the need for disconnecting and reconnecting the entire scale or multi-load cell assembly. The diagnosis can be handled from a remote location by connection of a computer to the master controller through telephone lines and modems. Further, when one or more (up to all but one) load cells are replaced the scale can be recompensated for load position by compensating only the replacement load cells and without the need for a test weight of known value.

BRIEF DESCRIPTION OF THE DRAWINGS

FIG. 1 is a block diagram of a system of multiple digital load cells embodying the present invention;

FIG. 2 is a front elevational view of a digital load cell suitable for employment in the present invention;

FIG. 3 is a top plan view of the digital load cell of FIG. 2;

FIGS. 8A to 8M are a flow chart illustrating the operation of each digital load cell in the present invention;

FIGS. 9A and 9B are a flow chart illustrating a linearity compensation procedure employed in the digital load cell;

FIGS. 10A to 10L are a flow chart illustrating the operation of the master controller of FIG. 7;

BEST MODE FOR CARRYING OUT THE INVENTION

Figure 4:
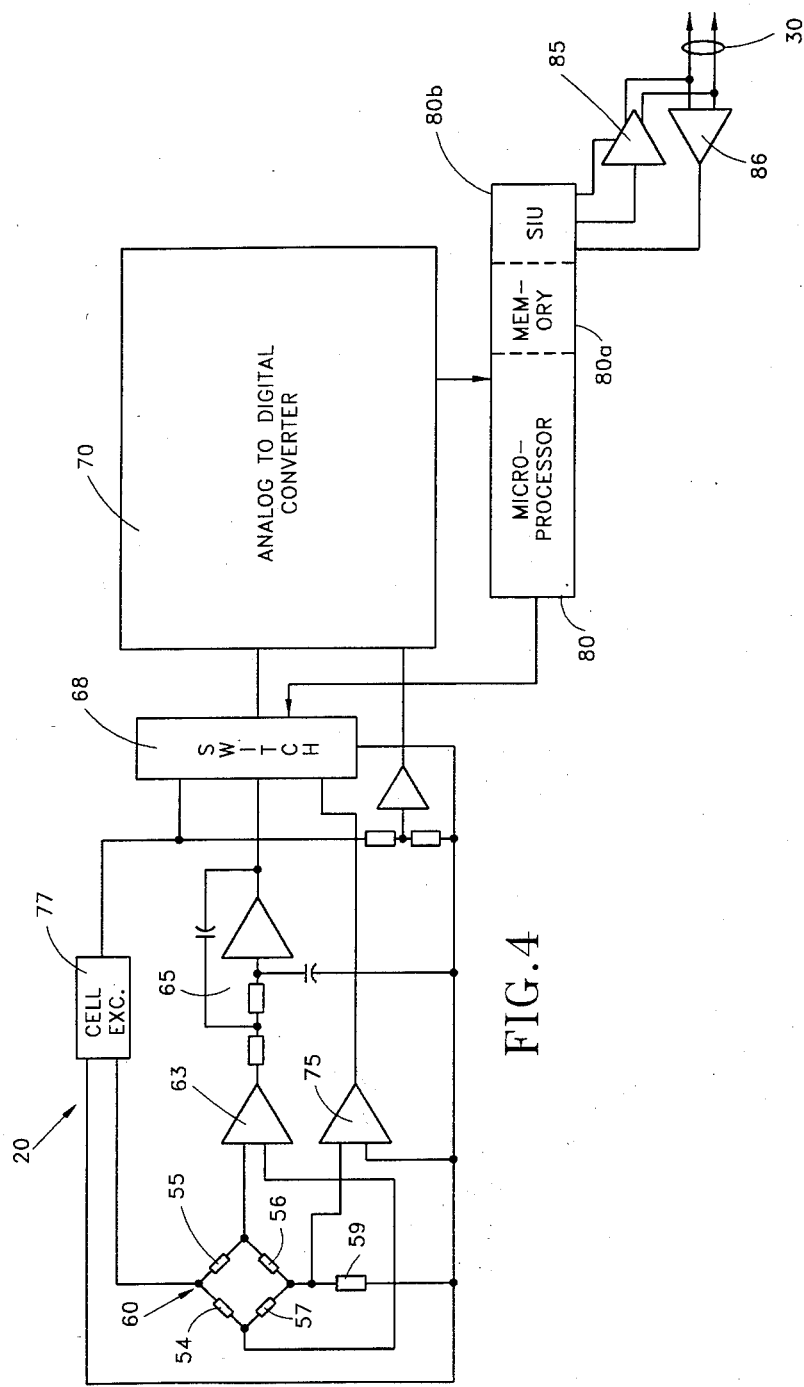
FIG. 4 is a block diagram of the electronic circuit of the digital load cell of FIGS. 2 and 3.

Referring now to FIG. 1, a system of multiple load cells embodying the present invention includes a number of groups of digital load cells 20, four groups being shown and identified by the numerals 11 to 14. The load cells 20 within each group 11 to 14 are connected together through junction boxes 22, 23, 24 and 25 by a multi-wire bus 30. The bus also connects the junction boxes together and to a master controller 34. Each group 11 to 14 is shown as comprising three load cells 20 but may include from one to a large number of load cells depending upon the particular application. The junction boxes 22 to 25 serve as wire termination points and one may be assigned to any number of load cells that is convenient in a particular application. The junction boxes could also contain, if desired, a common A/D converter and analog switch to permit sharing rather than each load cell having a dedicated A/D converter. Four groups 11 to 14 of load cells are shown but, as indicated by the dashed portion of bus 30, a greater or lesser number of groups may be employed in a given application.

The connection of the digital load cells 20 to each other and to master controller 34 through bus 30 provides the basis for a LAN, or local area network, in which communication can occur between the individual load cells 20 and master controller 34. Alternatively, each digital load cell 20 or the junction boxes 22–25 could be connected individually to master controller 34. The LAN, however, is preferred.

In the LAN, master controller 34 acts as the master and the individual load cells 20 as slaves incapable of initiating communication with the master controller. Preferably, the LAN utilizes the Intel BITBUS communication system. Master controller 34 polls the load cells 20 (slaves) or selected load cells as required. The load cells respond by transmitting data or requesting information from the master controller.

In the arrangement of FIG. 1, each group 11 to 14 of one or more digital load cells may constitute an individual scale so that the combined output of all load cells in the group represents relevant weight data to be gathered and operated on by master controller 34. An example of such an application would be the assignment of each group to weigh one particular tank or storage bin of many receiving and discharging material. The status and amount of material delivered by each tank or bin could then be monitored and controlled through master controller 34. In another application, all of the load cells 20 in groups 22 to 25 could be in the same scale, for example distributed at selected points beneath the platform of a vehicle scale or other scale utilizing a platform for weighing.

In the case of a single scale, master controller 34 polls all load cells periodically and sums the weight data to obtain the weight of the object on the platform. In the case of multiple scales, the system deals with only one scale at a time, as during a transfer of material into or out of the tank or bin or periodically to inventory the material remaining in the tank or bin. Master controller 34 need poll only the load cells of the particular scale and only when required.

As shown in FIGS. 2 and 3, each digital load cell 20 includes a counterforce generally designated 50 to which is mechanically fastened a printed circuit board 52. The electronic circuits mounted on board 52 enable the load cells to provide weight information in digital form to master controller 34. The particular counterforce 50 illustrated is known as a "rocker pin" which is preferred and has certain advantages in multiple digital load cell applications. Essentially any other type of counterforce, however, could be employed. Electrical transducers in the form of strain gages 54 to 57 are mounted on counterform 50 in a conventional manner and are connected in an electrical bridge circuit to provide an analog signal indicating the load applied to counterforce 50. Other types of transducers could also be employed, in conjunction with the rocker pin illustrated or with other types of counterforce as will be appreciated by those skilled in this art. A nickel resistor 59 is also mounted on counterforce 50 for sensing temperature changes and enabling compensation for the effects of such changes. Strain gages 54 to 57 and nickel resistor 59 are connected by suitable wiring (not shown) to the circuitry mounted on board 52.

As shown in FIG. 4, strain gages 54 to 57 are connected in the electrical bridge circuit 60 which provides a weight signal to a preamplifier 63. The weight signal from preamplifier 63 is coupled through an analog filter 65 to one input of an analog switch 68. The output of analog switch 68 is connected to the input of a multiple slope analog-to-digital (A/D) converter 70. Nickel resistor 59 is connected in series with bridge circuit 60 and provides a signal through a preamplifier 75 to another input of analog switch 68. Excitation is provided to bridge circuit 60 by a power supply 77 which also provides a known reference voltage through analog switch 68 to multiple slope A/D 70. The output of A/D converter 70 is connected to a microprocessor 80, preferably an Intel 8344. Microprocessor 80 controls the operation of analog switch 68 to cause analog weight signals from bridge 60 and temperature indicating signals from nickel resistor 59 to be converted to digital form by A/D converter 70 and transmitted to microprocessor 80.

Microprocessor 80 is provided with memory 80a including ROM, EEPROM and RAM for storge of programs and of data received from A/D converter 70 and from master controller 34. Microprocessor 80 is also equipped with a serial interface unit 80b connected through a driver 85 and a receiver 86 to bus 30 for communication with master controller 34.

Each of the digital load cells illustrated in FIGS. 2, 3 and 4 is programmed to operate as a slave to the master controller and to respond to commands directed to it. Each load cell has a unique address stored in local memory which allows the master controller to send commands to it only. All load cells are provided during manufacture with the same address which is replaced with a unique address during set up of the scale.

Each digital load cell is also programmed to compensate its weight readings for temperature effects on zero and span, for span trim and for linearity and creep. The compensation algorithms employed includng the values of the constants are stored in the load cell memory. The values of the constants are determined during manufacture of the load cell. The constants are determined by connecting the load cell to a host computer during manufacture, subjecting the load cell to the varying weights and temperature conditions required to provide data for use in the corrective algorithms and using the data to solve for the respective constants. The constants are then transmitted by the host computer to the load cell and stored in memory.

Figure 5:
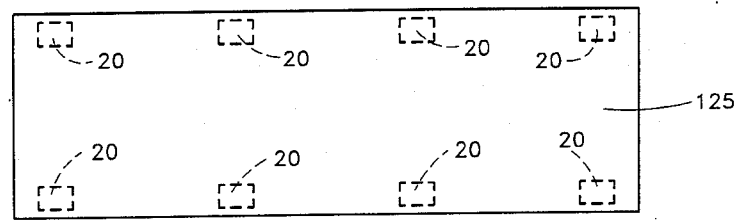
FIG. 5 is a plan view of a vehicle scale embodying the present invention.
Figure 6:
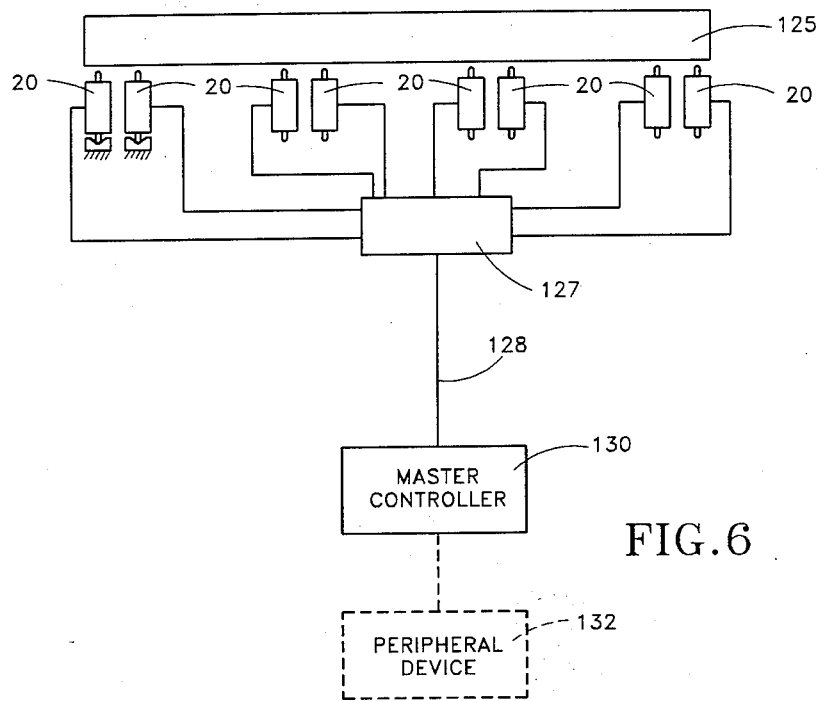
FIG. 6 is a diagram illustrating the connection of the major components of the vehicle scale of FIG. 5.

Referring to FIGS. 5 and 6, there is shown a system similar to the general application system of FIG. 1 but configured as a single scale for weighing vehicles. The system includes eight digital load cells 20 as described above supporting a platform 125 suitable for holding a vehicle such as a truck. The load cells 20 are connected together through a junction box 127 and through a bus 128 to a master controller 130. The master controller may be connected to one or more peripheral devices 132 such as a printer or host computer. The digital load cells 20 and master controller 130 are arranged and programmed to constitute a LAN with master controller 130 performing as the master and the load cells 20 as slaves. As in the system of FIG. 1, preferably the LAN utilizes the Intel BITBUS communication system.

Figure 7:
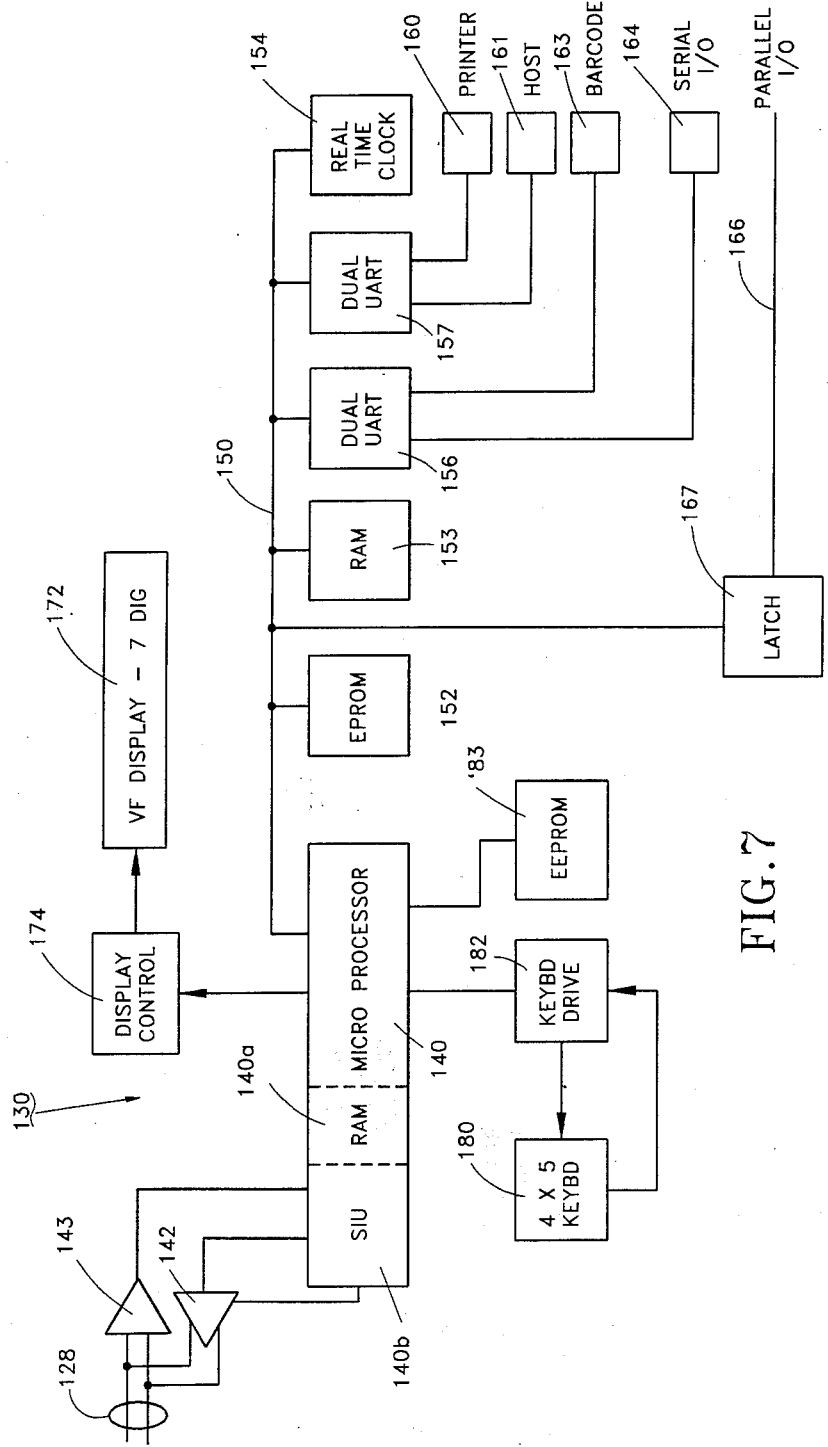
FIG. 7 is a block diagram of a preferred form of master controller used in the scale of FIGS. 5 and 6.

As shown in FIG. 7, master controller 130 includes a microprocessor 140, preferably an Intel 8344, provided with internal RAM memory 140a and a serial interface unit 140b. Microprocessor 140 is connected to bus 128 for communication with the digital load cells 20 through driver 142 and receiver 143 connected to serial interface unit 140b. Microprocessor 140 also communicates with an address/data bus 150 to which is connected a program memory 152, RAM 153, real time clock 154 and a pair of dual transmitters 156, 157. Transmitters 156 and 157 connect bus 150 to various peripheral devices such as a printer 160, host computer 161, bar code encoder 163 and a serial input/output line 164. A parallel input/output line 166 is also connected to bus 150 through a latch 167.

Microprocessor 140 provides weight data to a seven digit vacuum fluorescent display 172 through a display control 174. A keyboard 180 is connected to microprocessor 140 through a keyboard drive 182 for manual selection and inputting of various modes and options during calibration and set up of the system and for making slight changes in operation of the system. A nonvolatile programmable memory 183 is also connected to microprocessor 140 for the storage of various calibration constants and similar information determined during calibration and set up of the system.

The master controller shown in FIG. 7 is manufactured and sold by Toledo Scale Corporation, assignee of the present application, as a Model 8530 Digital Indicator.

In operation of the system of FIG. 1 or FIGS. 5 and 6, the master controller, acting as a LAN master, polls the load cells, LAN satellites or slaves, at a desired rate to receive weight data from each load cell. The data from each load cell may be operated on in certain respects, summed with the data from other load cells of the scale and the result further operated on to produce the final displayed weight. In the case of the multiple scale system of FIG. 1, the master controller polls only the load cells of a particular scale and operates on the information received in the same manner as described above. In each system, single scale and multiscale, each scale involved would require calibration and set up prior to operation.

Although connection and operation as a LAN is preferred, the digital output of each load cell, or group of load cells sharing an A/D converter, could be connected individually to the master controller rather than through a common bus. The essential feature is that the master controller receive and operate on digital information from each of the multiple load cells.

According to an aspect of the present invention, a multiple load cell scale is corrected digitally for load position errors. In the scale of FIGS. 5 and 6, when the same weight is placed at the same spot on platform 125 at different times the weight signals from the individual digital load cells 20 will be the same. When, however, the weight is placed in a different position on the platform the digital signals from the load cells (and their sum) may increase, decrease or remain the same according to the new position of the weight. In accordance with the present invention, these digital signals are modified so that the sum of the modified signals representing the weight on platform 125 remains substantially the same for different positions of the same weight on the platform.

The total weight, B, on platform 125 can be represented as:

$$B = A_1 + A_2 + A_3 + \cdots + A_N$$

where
  N is the number of load cells in the scale, and
  $A_j$ are the digital weight readings from the individual load cells.

The total weight on platform 125 corrected for load position can be represented by:

$$B_c = A_1 X_1 + A_2 X_2 + A_3 X_3 + \cdots + A_N X_N \tag{1}$$

where
  $B_c$ is the total weight corrected for load position,
  $X_j$ are constant load position correction factors for the individual load cells.

When the values of the load position correction factors, $X_j$, are known for the individual load cells they can be stored at the master controller 130 and used during operation to correct the load cell weight readings for load position.

The values of the coefficients $X_j$ for the individual load cells may be determined during calibration and set-up of the scale. The values of the coefficients may be determined utilizing equation (1) above and weight readings taken from each of the load cells with the same test weight placed at various positions on platform 125. For a scale having N load cells the same weight is placed sequentially at each of N positions on platform 125 (FIGS. 5, 6) and weight readings taken from each load cell at each position. The resulting data can be utilized to construct N equations of the form of equation (1) above in N unknowns, one equation for each position of the weight on platform 125. In each of the equations, $A_j$ are the weight readings from the N load cells with the test weight at the same position and $X_j$ are the unknown values of the constant coefficients. $B_c$ could be set equal to the value of the test weight. According to the present invention, however, the value of the test weight used need not be known. This is an advantage since test weights of known value are often very difficult to obtain, particularly for large vehicle scales. With the value of the test weight unknown, $B_c$ is set equal to the same number in each of the N equations of the form of equation (1). For example, $B_c$ in each equation could be set equal to the average of the N sums of the readings from the N load cells.

Solving for the values of the N unknown coefficients in the N equations can be accomplished by any of many generally known methods for the solution of simultaneous equations. A preferred method is known as "Gaussian Elimination Without Interchange". This method is described in many textbooks including "Linear Algebra With Applications" (2nd Edition) by S. J. Leon, published by McMillan Publishing Company, 1986. To ensure accurate solutions this technique requires that each load cell have one weight position reading in which it has the highest output of any of the N load cells. In cases where the test weight can be placed over essentially only one load cell at a time this condition is easily met. In usual practice, the weight is shared by many load cells but in the great majority of these cases the positions of the known weight can be chosen to ensure that a different one of the load cells bears most of the load for each of the positions.

In certain scales, it may not be possible to place the test weight over or sufficiently close to each individual load cell to meet the requirement. Such a problem would be encountered, for example, in a truck scale that is only slightly wider than the truck employed as the weight. In this case, the load cells could be loaded in pairs. That is, a pair of load cells is considered as one and the scale is loaded so that a different pair at each weighing position has the highest output of the load cells. In operation, the scale would be adequately load position compensated so long as substantially narrower loads are not used on the scale.

The correction equation for such a scale having N load cells is of the form:

$$B_c = (A_1+A_2)X_1 + (A_3+A_4)X_2 + (A_5+A_6)X_3 + \cdots + (A_{N-1}+A_N)X_{(N/2)}$$

where $B_c$, $X_j$ and $A_j$ are as defined in equation (1) above.

When the test weight cannot be placed so that each load cell has one weight position reading in which it has the highest output of any of the N load cells then the method of "Gaussian Elimination Without Interchange" may not provide satisfactory solutions. In that case, more conventional but time and computer memory consuming methods can be employed, for example, the method of matrices or any other standard method for solving N simultaneous equations in N unknowns. It remains a requirement that the equations be independent.

Prior to operation of the scale system of FIGS. 5 and 6 it must be set up and calibrated. This occurs after the load cells have been positioned beneath the weighing platform but prior to connection of the individual load cells to the master controller in the local area network. The set up mode is selected through the keyboard of the master controller and the number of load cells in the scale system is entered by the same means. Addresses are then assigned to the load cells in sequence beginning with number 1. Only the first load cell is connected to the bus and address number 1 transmitted to it and stored in the load cell memory. The second load cell in the system is then connected to the bus and address number 2 assigned to it in the same way. The process continues until all of the load cells have been connected to the bus and assigned different addresses. The master controller is then able to communicate with each of the load cells in the local area network for continued calibration and set up.

Another step in the set up procedure is determination of the load positon correction constants in equation (1) above. In this procedure, a test weight, which can be of unknown value, is placed over the first load cell of the scale and weight readings taken from each of the load cells and stored in the master controller memory. The same weight is then positioned over the second load cell and weight readings taken and stored. This process is continued until weight readings have been taken for all of the N load cells with the same weight at each of the N positions. The data is used to construct and solve N equations in N unknowns by the technique described above to obtain the values of the load position correction constants. The constants are stored in memory at the master controller along with equation (1) for use in correcting the weight readings for load position during operation. In some cases, one or more of the load cells outputs might not require correction for load position. In that case, the correction constant would simply be equal to 1 and the corrected and uncorrected readings from that load cell or cells would be equal.

During set up the system is also calibrated for zero and span and calibration values obtained in the process are stored in memory at the master controller for use in weighing operations.

Figure 8A:
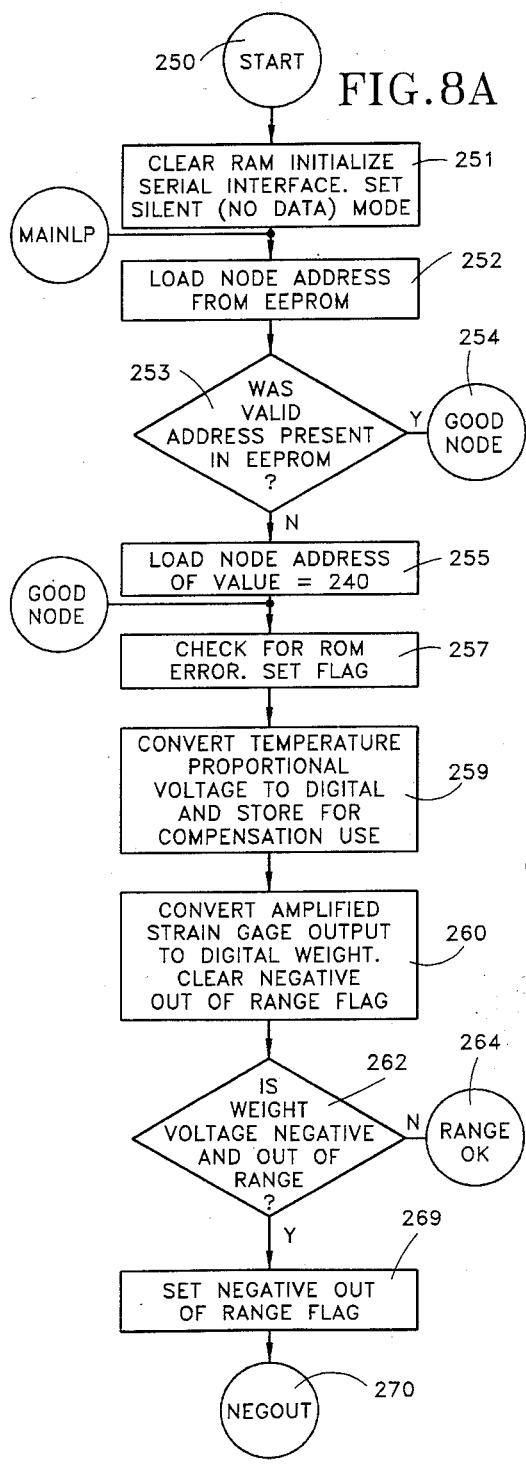
Figure 8B:
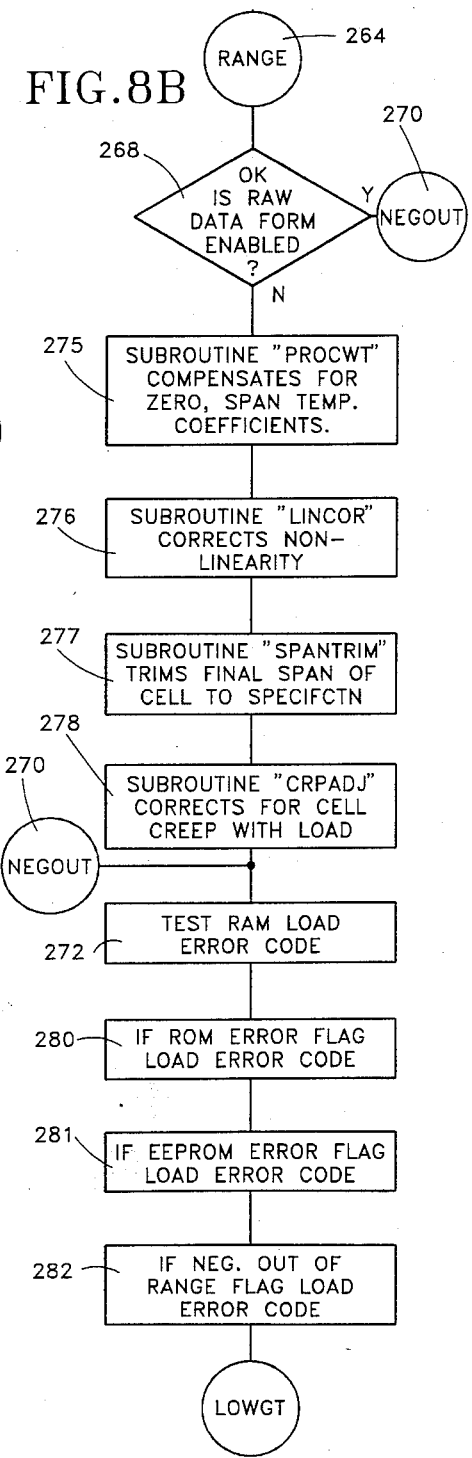
Figure 8C:
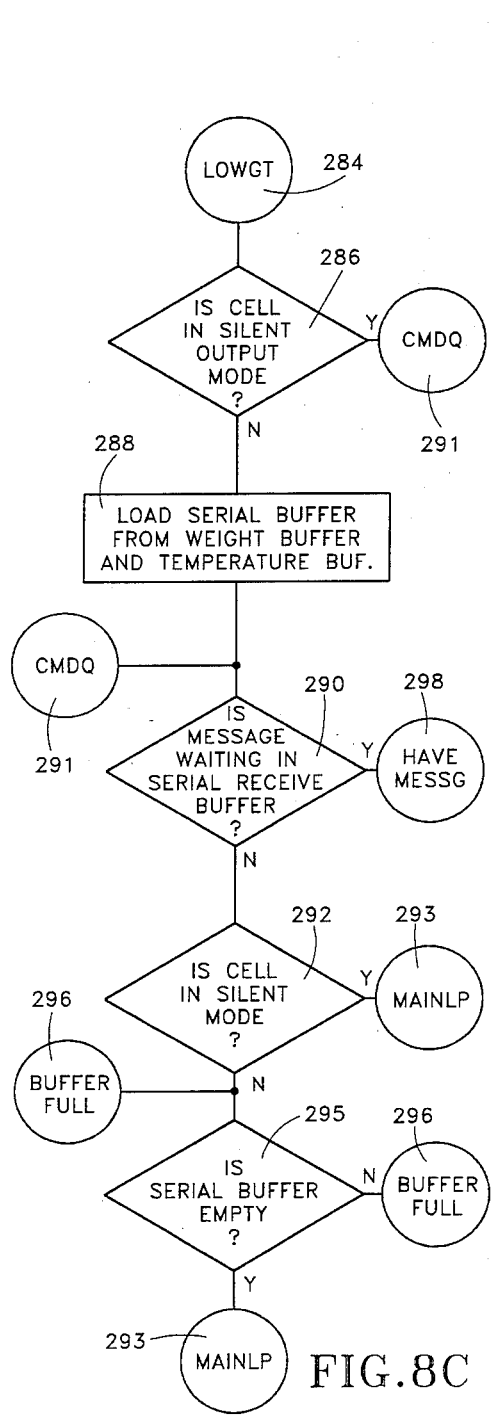
Figure 8D:
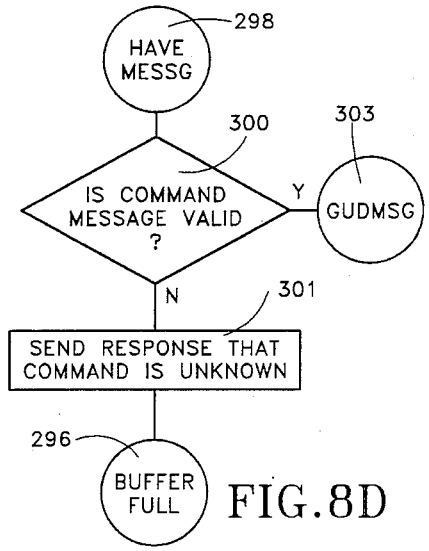
Figure 8E:
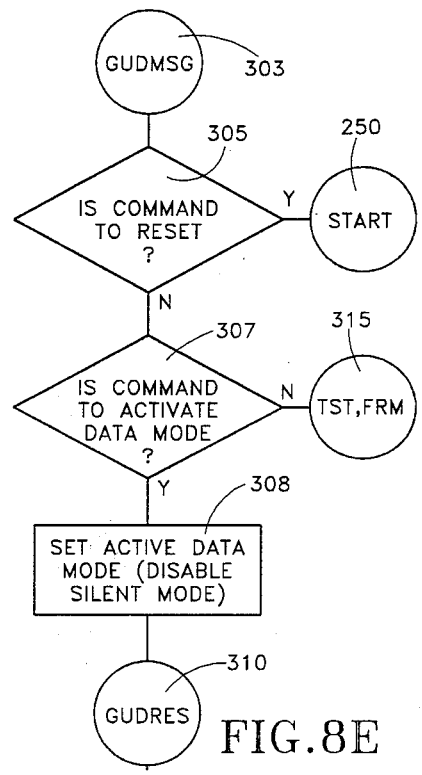
Figure 8F:
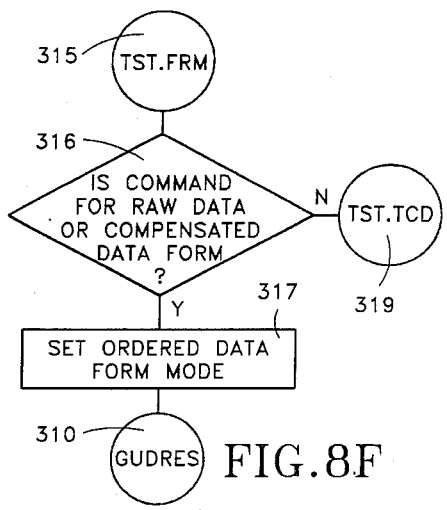
Figure 8H:
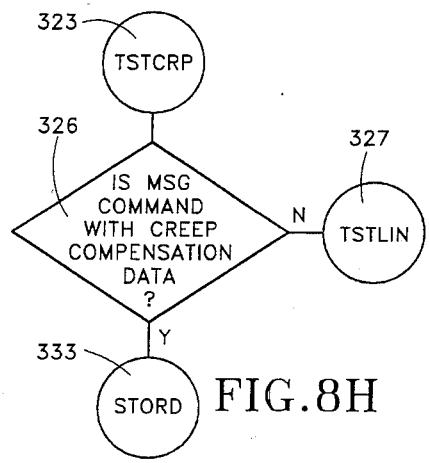
Figure 8G:
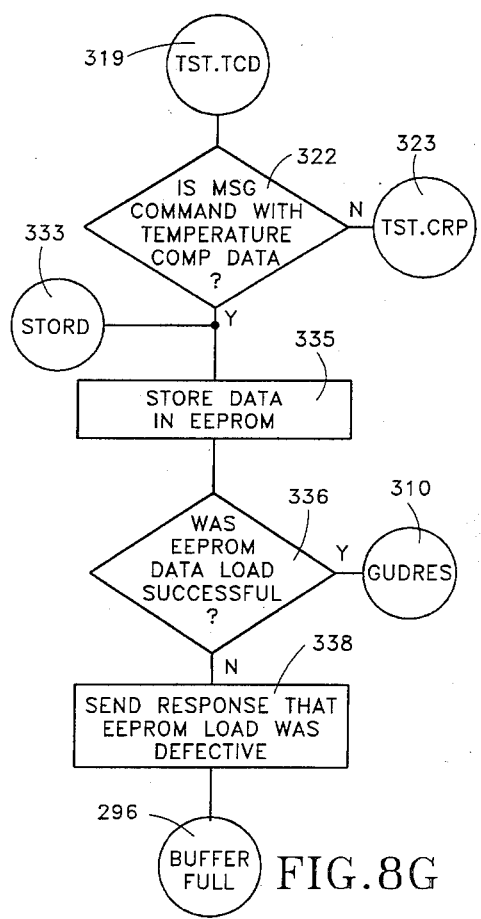
Figure 8J:
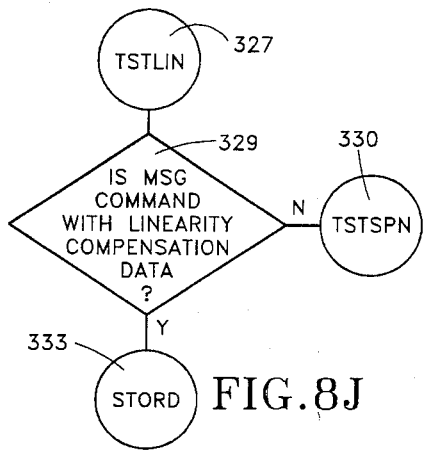
Figure 8K:
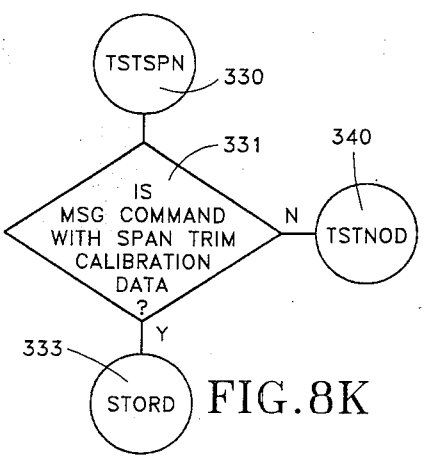

The flow chart of FIGS. 8A to 8M illustrates the operation of the digital load cell, whether connected in the system of FIGS. 5 and 6 or connected to a host computer for calibration and calculation of correction constants during manufacture. After START at block 250 operation is begun in the "silent" mode at block 251. This is essentially a local mode in that the master controller or host computer has not yet initiated communication with the load cell. At blocks 252 and 253 the load cell address is taken from memory and checked for validity. If the stored address was invalid an address of arbitrary value, for example, 1 or 240, is loaded at block 255. After the stored address has been determined to be valid or a new one assigned, operation proceeds directly or through point 254 to block 257 where a check is made for ROM errors and a flag is set if any such errors are found. Then, at block 259 a temperature reading is obtained from nickel resistor 59 in FIG. 4 and stored for compensation use. At block 260 a digital weight reading is taken and a negative out-of-range flag cleared. The weight reading is checked at block 262 to determine whether or not it is out of range. If not, operation proceeds through point 264 to block 268 (FIG. 8B) where a determination is made as to whether the data should be compensated or presented in its raw form. If, at block 262, the weight reading is determined to be out-of-range a flag is set at block 269 and operation proceeds through point 270 to block 272 (FIG. 8B). Likewise, if the weight reading is not to be compensated as determined at block 268 operation jumps through points 270 to block 272.

If the weight reading is to be compensated a subroutine is performed at block 275 to temperature compensate the zero and span coefficients. At block 276 a subroutine "LINCOR" is utilized to correct the weight reading for nonlinearity as will be described below. Subroutines are performed at blocks 277 and 278, respectively, to modify the weight reading according to a span trim coefficient and to correct the weight reading for creep in the load cell.

At blocks 272, 280, 281 and 282 memory errors and out-of-range data are investigated and an appropriate error code loaded if any of the conditions are found. Operation then proceeds through point 284 to block 286 (FIG. 8C) where it is determined whether or not the load cell is in the silent mode. If not, the weight and temperature readings are loaded at block 288 into a serial buffer for transmission and operation proceeds to block 290. If the load cell is in silent mode block 288 is bypassed through point 291 to block 290 where a check is made for any messages received from a host computer or master controller. If there are no messages and the cell is in silent mode as determined at block 292, operation returns through point 293 to the main loop at block 252 and the operation described above is repeated. If the load cell is not in the silent mode operation proceeds from block 292 to block 295 and cycles through point 296 until the serial buffer is empty, indicating that the weight and temperature readings have been transmitted to the master controller or host computer. At that time operation returns through point 293 to the main loop at block 252 (FIG. 8A).

When a message has been received as determined at block 290 operation proceeds through point 298 to block 300 (FIG. 8D) where the validity of the message is determined. If the message is not valid a response to that effect is sent at block 301 and operation returns through point 296 to block 295. If the message is valid as determined at block 300 operation proceeds through point 303 to block 305 (FIG. 8E) to determine the content of the message. A message command to reset causes operation to return to START point 250. If the message is a command to activate data output as determined at block 307, silent mode is disabled at block 308 in favor of an active data mode. Operation then proceeds through point 310 to block 311 (FIG. 8M) to respond to the master controller or host computer that the order is implemented. The cycle then proceeds through point 296 to block 295 (FIG. 8C) to transmit the data and return to the beginning of operation at block 252.

If the message was determined at block 307 (FIG. 8E) to be other than a command to activate data output, operation proceeds through point 315 to block 316 (FIG. 8F) to determine if the message is a command for data in raw or compensated form. If so, the ordered data mode is set at block 317, a response is made through point 310 and block 311 that the command has been implemented and operation returns through point 296 to block 295.

If the message was not a data form command as determined at block 316, operation proceeds through point 319 to a series of inquiries to determine whether or not the message is one containing compensation data, such as algorithm compensation constants, to be stored in memory. At block 322 (FIG. 8G), a determination is made as to whether or not the message includes temperature compensation data. If not, operation proceeds through point 323 to, in sequence, block 326 (FIG. 8H) to determine if the data is creep compensation data, point 327 and block 329 (FIG. 8J) to determine if the data is linearity compensation data, and point 330 and block 331 (FIG. 8K) to determine if the data is span trim calibration data. If the message is determined to contain one of the types of compensation data, operation proceeds through point 333 to block 335 (FIG. 8G) where the data is stored in memory. A check is then made at block 336 to determine if the data load was successful. If so, operation proceeds through point 310 to block 311 to respond that the message command has been implemented and then through point 296 to block 295. If the data load was not successful, a response to that effect is sent at block 338 and operation proceeds through point 296 to block 295.

It should be noted that compensation constants for correcting for temperature, creep, linearity, and span trim calibration are transmitted to the digital load cell only during set up as part of the manufacturing process. Accordingly, results of the tests described above for the presence of such data in a received message would be negative when the load cell is operating as a part of the scale system of FIGS. 5 and 6.

Referring again to FIGS. 8A to 8M, when the received message has undergone the last test for containing of data constants at block 331 (FIG. 8K), operation proceeds through point 340 to block 341 (FIG. 8L) for a determination as to whether the message includes an address assignment for the load cell. If not, operation proceeds through point 296 to block 295. If the message is an address assignment the address is stored in memory at block 343 and a check made at block 344 to determine if loading of the address was accomplished satisfactorily. When the address load was not satisfactory a response to that effect is sent at block 345 and operation proceeds through point 296 to block 295. If the address was loaded successfully as determined at block 344, operation proceeds through point 310 to block 311 (FIG. 8M) for transmission of a response that the command has been implemented. Operation then proceeds through point 296 to block 295.

FIGS. 9A and 9B illustrate the steps in subroutine LINCOR performed at block 276 (FIG. 8B) for providing a linearity correction to the weight reading. The subroutine is entered at point 350 (FIG. 9A) and proceeds to block 351 where the linearity compensation constants D and E are loaded. Operation then proceeds to block 353 where a check is made to determine if the constants were loaded correctly. If not, operation proceeds through point 354 to block 355 (FIG. 9B) where an error flag is set and operation returns through point 357 to the main program at block 277. If the linearity compensation constants were loaded satisfactorily as determined at block 353, operation proceeds to block 358 where a linearity-corrected weight reading is calculated and stored. Operation then returns through point 357 to block 277 in the main program.

It will be apparent from the foregoing description that the operation of each digital load cell in the system of FIGS. 5 and 6, once the load cell has been assigned an address and transferred from a silent to an active data mode, consists primarily of taking weight and temperature readings, compensating the weight reading for various factors mentioned above and providing it to the master controller.

The flow chart of FIGS. 10A to 10L illustrates the operation of the master controller 130 in the scale of FIGS. 5 and 6. After power up at block 400 and some initializing steps at block 401 the number of load cells in the system is extracted from memory at block 403 and the information checked at block 405. If the number of load cells has not been entered and the cells identified set up mode will be selected at block 406 and operation will jump through point 407 to decision block 410 (FIG. 10B) to check for keyboard activity. If there is keyboard activity and the system is in set up mode as determined at block 412 operation jumps through point 413 to decision block 415 (FIG. 10C) to determine if the number of load cells and their addresses are known. Since they are not, operation proceeds to decision point 417 to determine if the keyboard indicates single/total key activity. If so, operation jumps through point 418 to blocks 420 and 421 (FIG. 10D) where an appropriate display is ordered and a single cell flag set or cleared according to whether one or more load cells are in the system. Operation then jumps back through point 423 to blocks 425 and 426 (FIG. 10C) where the number of load cells is entered and addresses assigned to them. The load cell addresses are assigned by connecting only the first load cell to the bus, addressing it as number 240 which is assigned to all load cells at manufacture and then instructing it to change that address to the newly assigned address. The second load cell in the system is then connected to the bus and the procedure repeated. This continues until all load cells have been connected to the bus and assigned addresses.

From block 426 operation proceeds through point 430 to blocks 432 and 433 (FIG. 10E) where a reset command is sent to all load cells followed by an order to supply data when polled. If any cell does not respond positively as determined at block 435 the address of the highest ranking non-responsive cell is displayed at block 436 to enable operator intervention, if necessary. Operation then jumps through point 423 to blocks 425 and 426 (FIG. 10C) where load cell addresses are again assigned and then returns through point 430 to blocks 432, 433 and 435. Operation proceeds around this loop until all load cells in the system have responded positively as determined at decision block 435.

From decision point 435, operation proceeds through point 440 to decision block 442 (FIG. 10F) to determine if the system has exited set up mode. If not operation jumps through point 445 to block 446 (FIG. 10G) to begin checking for the activation of one or more of a series of keys which command various set up functions. If a key command is detected at decision block 446 to reassign a load cell address, operation jumps through point 448 to the procedure illustrated in FIGS. 12A and 12B which will be described below. Reassignment of a load cell address may become necessary when, for example, a single load cell in the system of FIGS. 5 and 6 has been determined to be defective and must be replaced. In that case, a new load cell must be assigned the same address as that of the load cell replaced.

At the end of the load cell address reassignment procedure operation returns through point 440 (FIG. 10F) to decision block 442 to determine whether or not the set up mode has yet been exited. If not, operation proceeds through point 445 to resume scanning for key commands. If, at decision block 453 (FIG. 10G), a key command has been received to calibrate the scale operation jumps through point 455 to that procedure. When the calibration operation is completed operation returns through point 440 to decision block 442 (FIG. 10F) and through point 445 to resume scanning for key commands. Operation continues in this manner through decision blocks 457, 459 and 461. A shift adjust key command at block 457 initiates through point 463 a procedure illustrated in FIG. 11 described below. A key command detected at block 459 initiates a calibration trim procedure through point 465. A key command at block 461 causes operation to jump through point 467 to the procedure illustrated in FIG. 13 and described below.

Figures 10A, 10B:
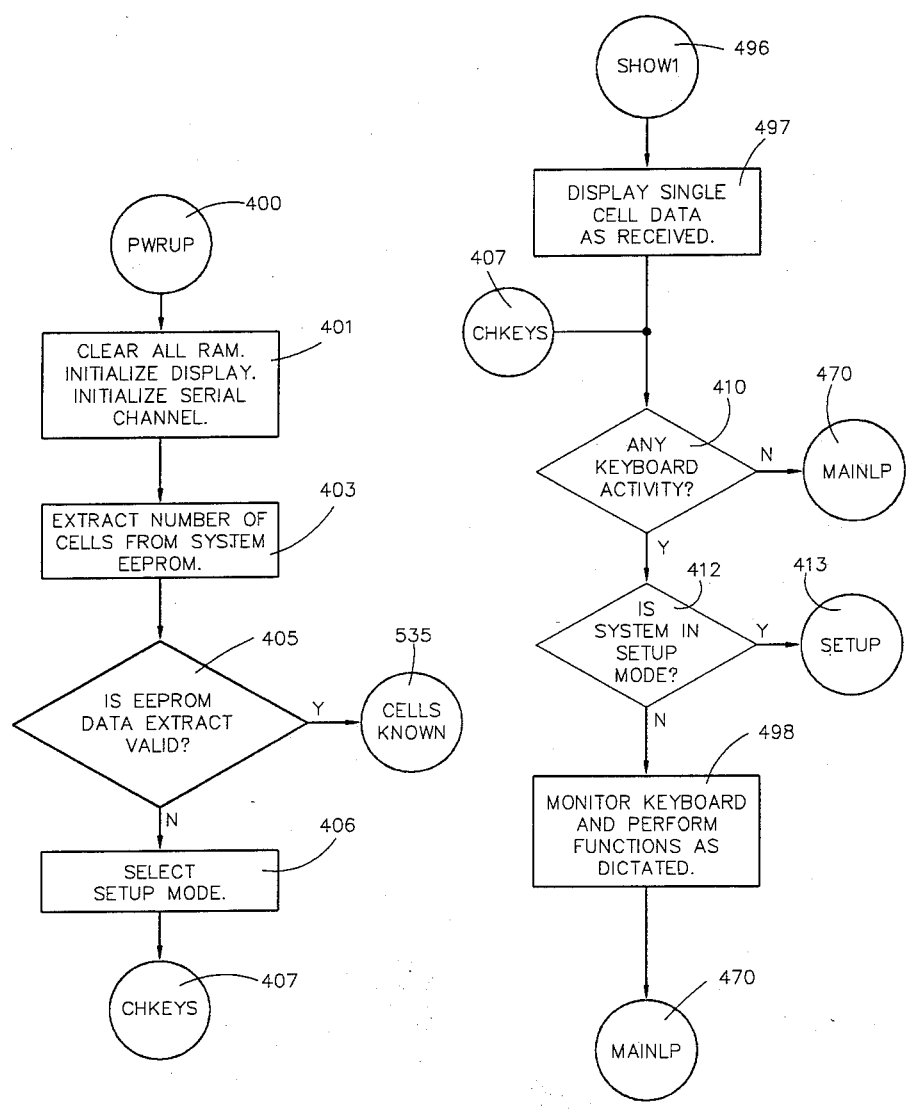
Figures 10C, 10D:
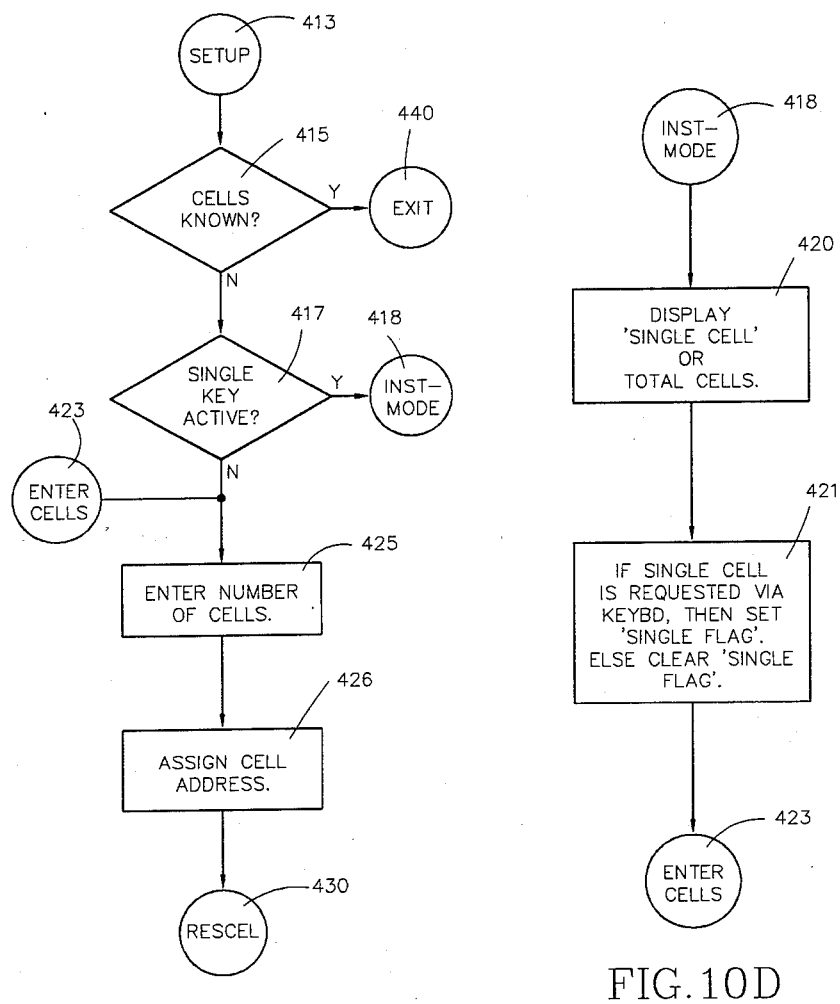
Figures 10E, 10F:
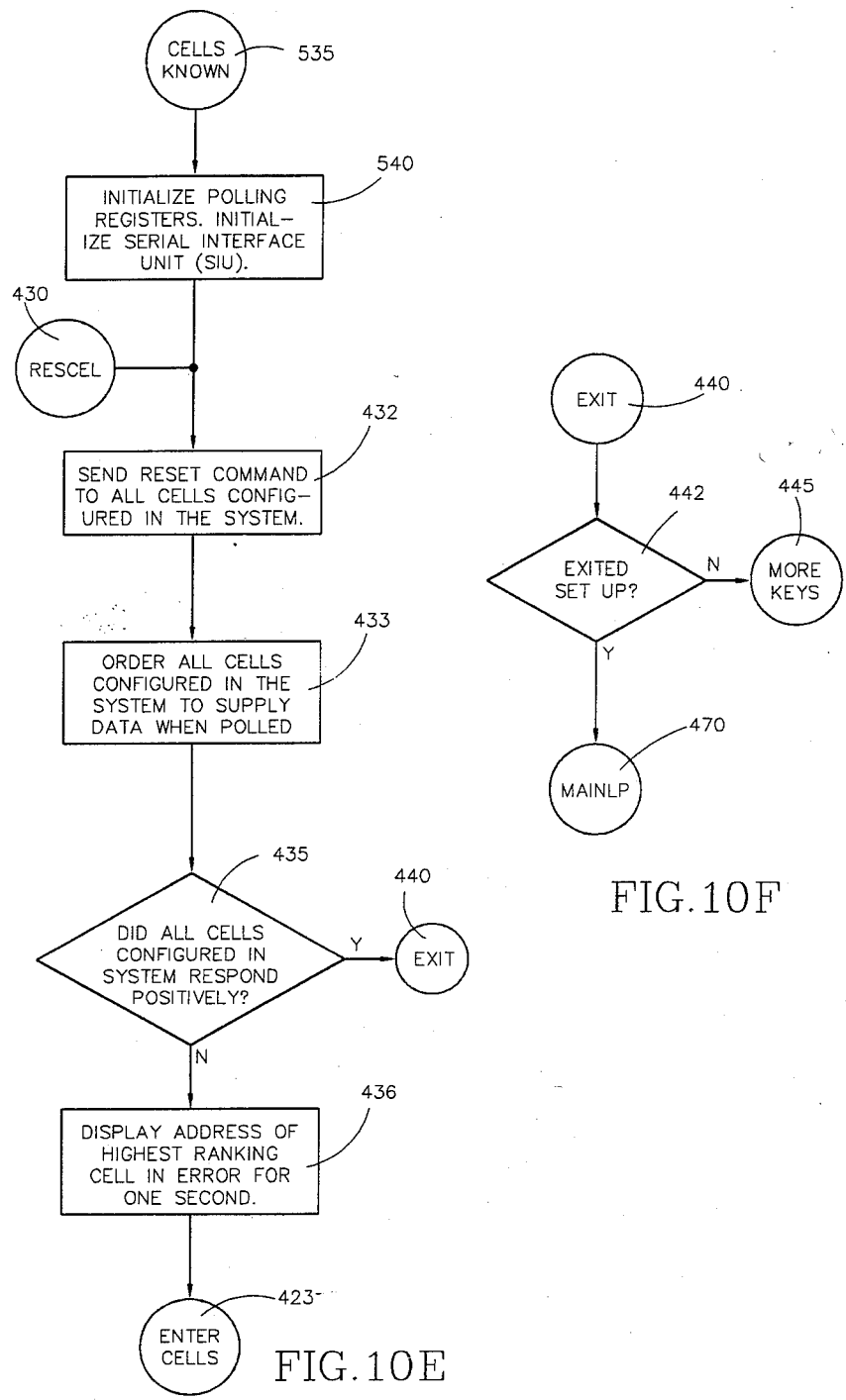
Figures 10G, 10H:
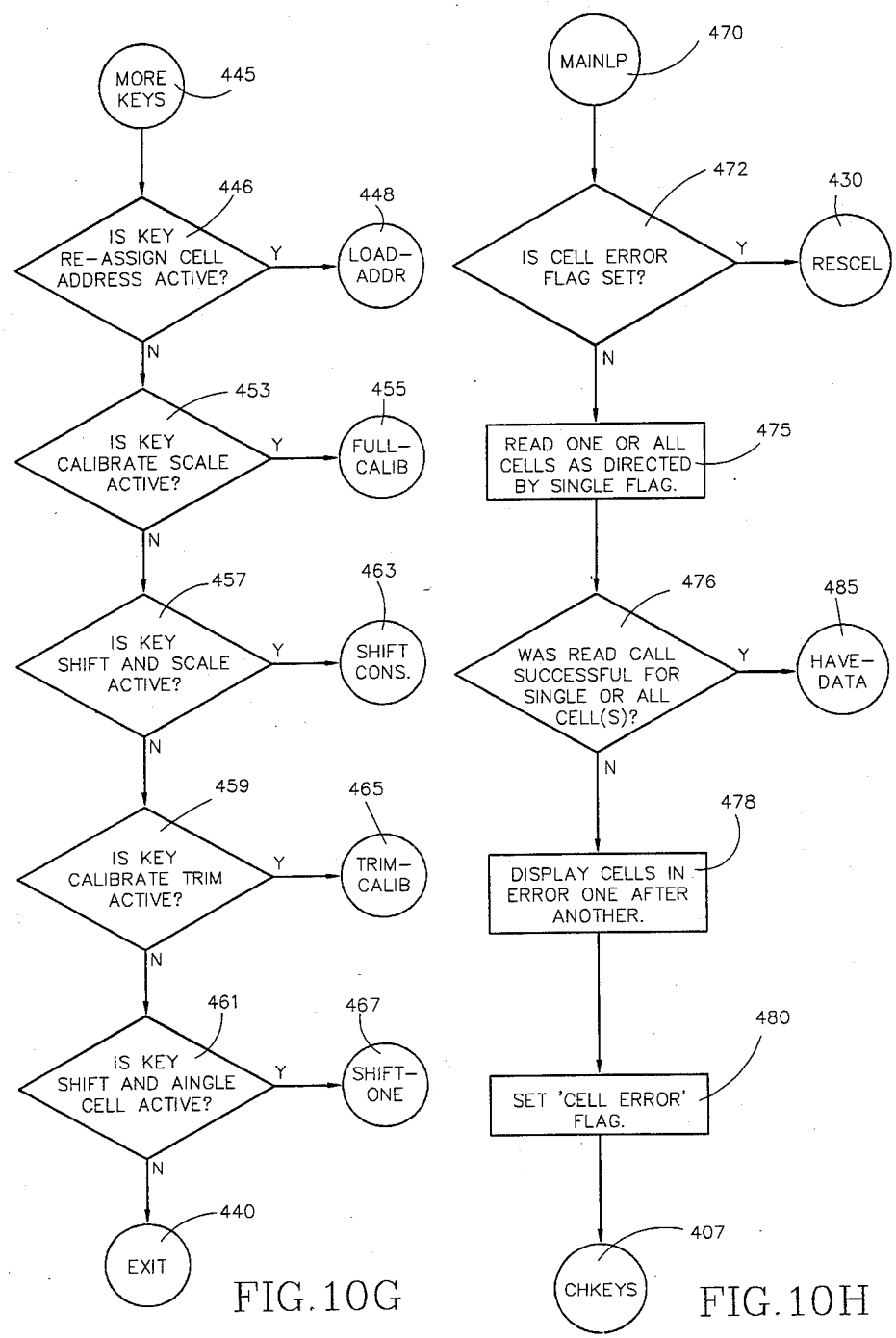
Figure 10J:
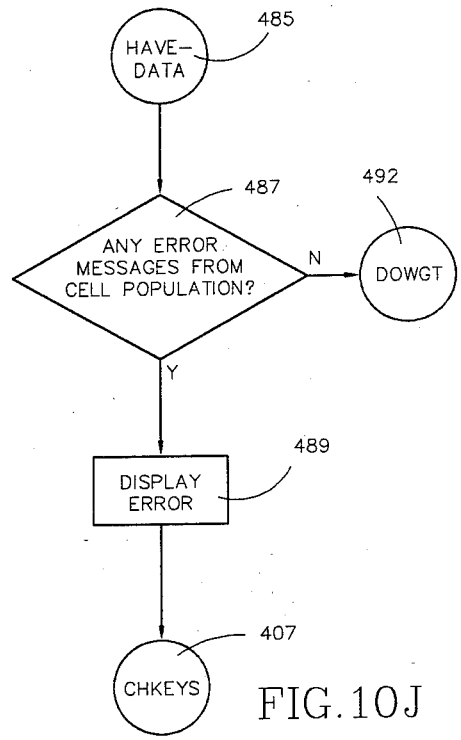
Figure 10L:
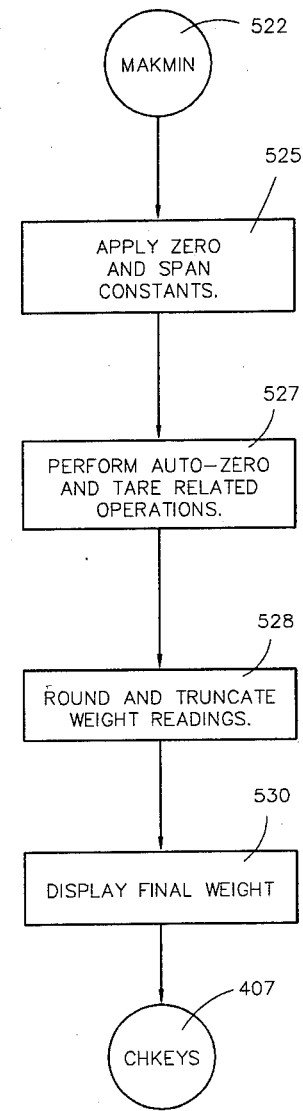

When all key commands have been satisfied operation proceeds through point 440 to block 442 (FIG. 10F). When set up mode has been exited operation proceeds through pooint 470 to decision block 472 (FIG. 10H). If no load cell error flag has been set, readings are taken from all of the load cells at block 475 and a check made at block 476 to determine if data was received from all cells. If not, the addresses of the load cells in error are displayed at block 478 and a cell error flag set at block 480. Operation then jumps through point 407 to decision block 410 (FIG. 10B) and if there is no keyboard activity returns through point 470 to decision block 472. Since the cell error flag has been set, operation proceeds through point 430 to blocks 432 and 433 (FIG. 10E) where the load cells are reset and reordered to supply data. If all cells do not respond positively as determined at block 435, operation proceeds through block 436 and point 423 to blocks 425 and 426 (FIG. 10C) to again assign load cell addresses and then returns through point 430 until, as determined at block 435 (FIG. 10E), all cells respond positively. Operation then proceeds through point 440 and decision block 442 (FIG. 10F) and through point 470 and block 472 (FIG. 10H) to again read all cells at block 475.

Figure 10K:
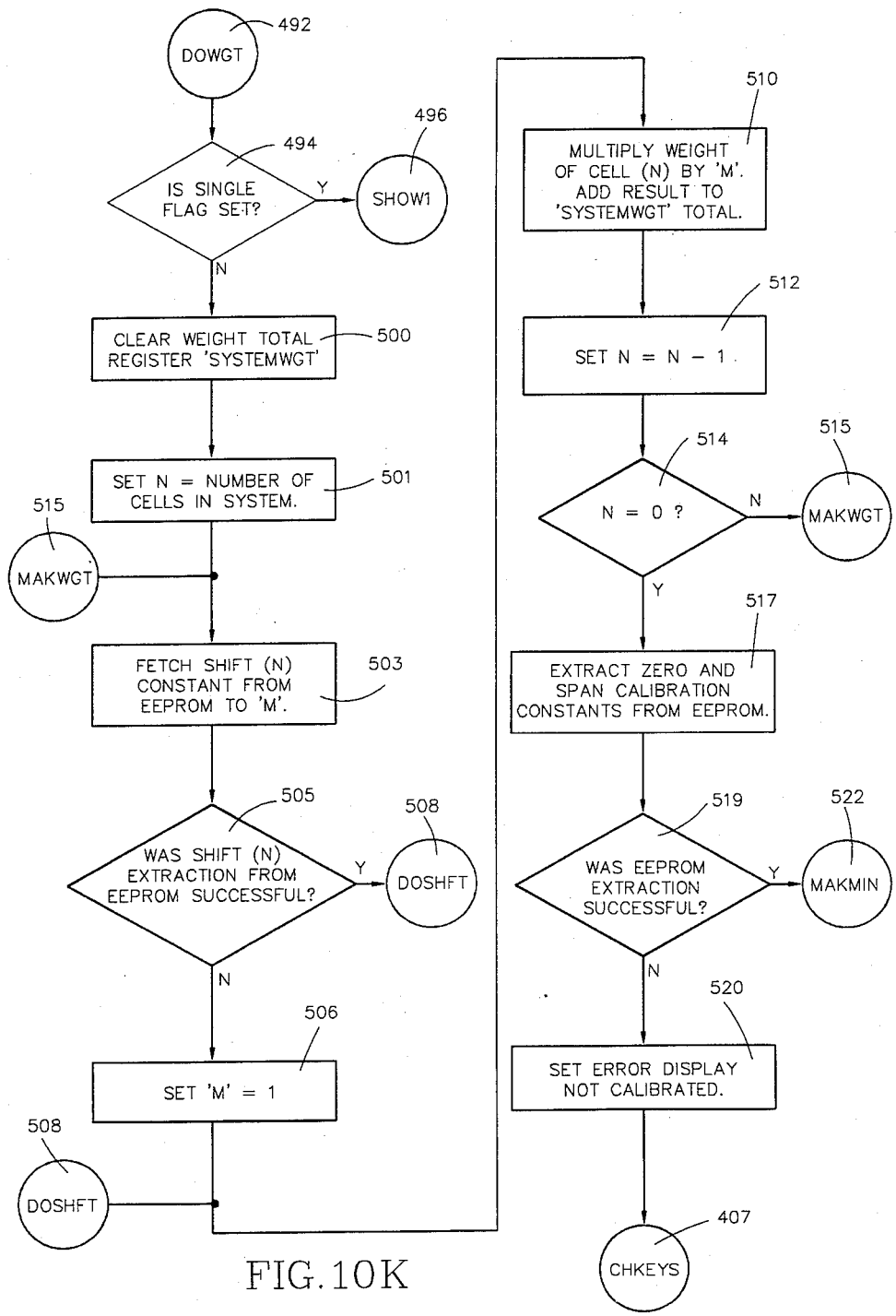

When, as determined at block 476, data is obtained from all load cells operation proceeds through point 485 to decision block 487 (FIG. 10J) to check for any error messages received with the load cell data. If any such error messages are received the fact is displayed at block 489 and operation proceeds through point 407 to block 410 (FIG. 10B). If there is no keyboard activity operation returns through point 470 to again read data at block 475 (FIG. 10H) from all the load cells. When a determination is made at block 487 (FIG. 10J) that no error messages have been received with the data, operation proceeds through point 492 to decision block 494 (FIG. 10K). If, as determined at block 494, the single cell flag is set operation jumps through point 496 to block 497 (FIG. 10B) where the single load cell data is displayed. Operation then returns to point 470 (FIG. 10H) through block 410 alone or through blocks 412 and 498.

If, as determined at block 494 (FIG. 10K), the single cell flag is not set operation is begun at block 500 to adjust the weight readings from the load cells for load position and to sum the readings to obtain the total weight on the scale. At block 500 the total weight register is cleared and at block 501 a register is set to N, the number of load cells in the system. The load position correction constant X for the highest numbered load cell in the system is fetched from memory at block 503 and loaded into register M. If the fetching of the load position constant X for load cell N was not successful as determined at block 505, the numeral 1 is loaded into register M at block 506 and operation continues. If the load position constant was successfully fetched from memory as determined at block 505 operation jumps through point 508 to block 510 where the weight reading from load cell N is multiplied by load position constant $X_N$ stored in register M and the result added to the total weight register. Then, at block 512, N is decremented and tested at block 514 to determine if it is equal to zero. If not, operation returns through point 515 to block 503 where the shift adjust constant X for the next highest numbered load cell in the system is fetched from memory and loaded into register M.

Operation proceeds in the same manner as described above until the weight readings from all of the load cells have been multiplied by the respective load position correction constants and summed in the total weight register. At that point, block 514 will determine that the readings from all load cells have been summed. The zero and span calibration constants will then be fetched from memory at block 517. If the memory fetch was not successful as determined at block 519 an error display will be made at block 520 and operation will return through point 407 to block 410 (FIG. 10B). If the memory fetch was successful operation proceeds through point 522 to block 525 (FIG. 10L) where the zero and span constants are applied to the weight reading. Then, at block 527, other operations are performed relating to auto-zero and tare. At block 528 the weight reading is rounded and truncated for display and at block 530 the final weight is displayed. Operation then returns through point 407 to block 410 (FIG. 10B) to check for keyboard activity and poll the load cells for weight readings.

Returning to FIG. 10A and decision block 405, the above description assumed that addresses had not yet been assigned to the load cells in the system. If, however, addresses had previously been assigned as determined at block 405 operation would proceed through point 535 to block 540 where preparations would be made for polling the load cells. Operation would then proceed as described above with reset commands being sent to all load cells at block 432.

Figure 11:
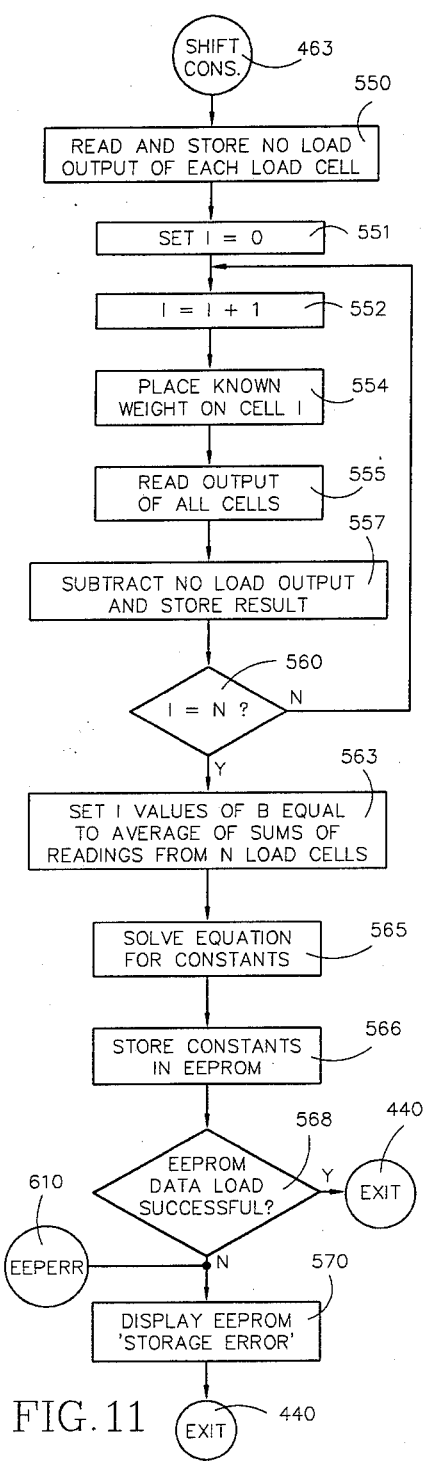
FIG. 11 is a flow chart illustrating a procedure for determining the values of load position correction constants for the digital load cells in the flow chart of FIGS. 10A to 10L.

FIG. 11 illustrates the procedure for determining the values of the load position correction constants $X_j$. The procedure is initiated by detection of a key command at block 457 (FIG. 10G) during set up of the scale. The procedure is entered through point 463 and at block 550 the no load output of each load cell is read and stored. At blocks 551 and 552 a weight position counter is cleared and then incremented. A test weight of unknown value is then placed over the first load cell at block 554 and the output of all load cells read at block 555. Then, at block 557 the readings are normalized by subtracting the no load readings and the results are stored. At block 560, a check is made to see whether the weight position count I is equal to N, the number of load cells in the system. If not, operation returns to block 552 where the weight position counter is incremented and block 554 where the test weight is placed over the next load cell. Operation continues in this manner until normalized weight readings have been obtained from each of the N load cells at each of N positions of the test weight.

Then, at block 563 the N values of $B_c$ in Equation 2 are all set equal to the average of the N sums of the readings from the N load cells. This establishes the value of $B_c$ for each equation. Then, at block 565, the N equations in N unknowns are solved by the method of Gaussian Elimination identified above to obtain the values of the constants $X_j$. The values of the constants are then stored at block 566 and a determination made at block 568 as to whether the memory load was successful. If so, operation returns through point 440 to block 442 (FIG. 10F). If the data load was not successful an error display is ordered at block 570 and operation returns through point 440 to block 442.

An important aspect of the present invention is the ability to replace one or more defective load cells in a multiple load cell scale and to retain the ability to correct for load position of the newly constituted scale with a minimum of difficulty. Since each load cell in the scale can be monitored and diagnosed individually a defective load cell can be easily found. When that happens, a new load cell is inserted into the system to replace the defective one, an address is assigned to the new load cell and a new load position correction constant is determined for the new load cell.

Figures 12A, 12B:
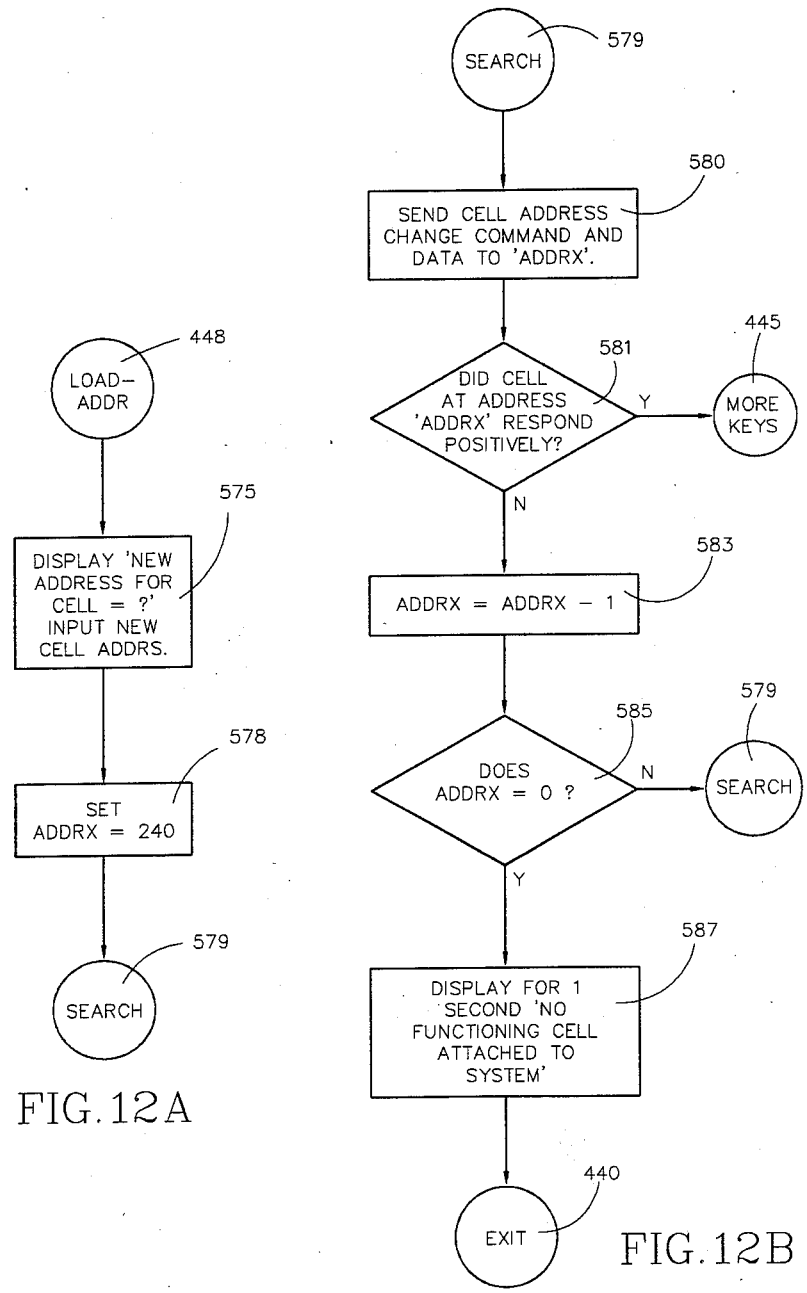
FIGS. 12A and 12B are a flow chart illustrating the procedure for assigning an address to a replacement load cell in a multi-load cell system.

FIGS. 12A and 12B illustrate the procedure for assigning the address to the new load cell. The procedure is entered through point 448 when a key command to reassign a load cell address has been detected at block 446 (FIG. 10G). Initially, all of the other load cells in the scale system must be disconnected from the bus so that only the new load cell is connected thereto. Referring to FIG. 12A, the new load cell address, which in this case would be the same as that of the removed defective load cell, is entered through the keyboard at block 575 in response to a prompting message from the display. At block 578 an address of 240 is loaded into an address register and operation proceeds through point 579 to block 580. There, a load cell address change command and the new address are transmitted to the load cell address, in this case 240, in the address register. Then, at block 581 a determination is made as to whether or not a positive response was obtained from the addressed load cell. If so, the new address has been satisfactorily assigned and operation returns through point 445 to scanning the keyboard at block 446 (FIG. 10G). This wold normally be the result when the replacement load cell is a new load cell since address 240 is loaded into all load cells at manufacture.

In some cases, however, the replacement load cell would not be a new load cell and could have a stored address other than 240. In that case, operation would proceed from decision block 581 to block 583 where the contents of the address register are decremented and then, at block 585, compared to zero. If the contents of the address register are not equal to zero operation returns through point 579 to transmit the address change command and new address to the decremented load cell address and then check at block 581 for a positive response. Operation proceeds in this manner until a positive response is obtained from the replacement load cell or until the contents of the address register have been determined to be equal to zero at block 585. In that case the display is caused at block 587 to indicate that no functioning load cell is attached to the system and operation returns through point 440 to block 442 (FIG. 10F).

With the replacement load cell installed the scale must now be recompensated for load position. Assuming that load position correction constants have previously been determined for each load cell in the scale, that only one load cell is replaced and that the change of load cells does not affect the correction constants of the unchanged load cells, a correction constant for the new load cell may be obtained using an unknown weight and only two weight readings. The load position corrected output of a scale having a load positioned at any weight position i on a scale of N load cells is given by:

$$B_i = (A_{i,1})X_1 + (A_{i,2})X_2 + \ldots + (A_{i,N})X_N \quad (2)$$

where, $A_{i,j}$ is the output reading of the jth load cell with the weight at position i, and $X_j$ is the correction constant for the jth load cell.

Under the assumptions given above values of $X_j$ for all load cells except the one added are known. If, for example, the sixth load cell were to be replaced then a new $X_6$ would have to be calculated. In equation (2) above there are two unknowns, $X_6$ and the test weight B. Since there are two unknowns only two equations are required to determine the values of the unknowns. To obtain the required data, a test weight of unknown value is first placed over the new load cell, No. 6, and readings taken for each load cell in the scale. The unknown weight is then positioned at a different position (preferably, so that the load on the replacement load cell is minimized) and weight readings taken from each of the load cells. Equation (2) with the data from the first set of readings with the weight on new load cell No. 6 is:

$$B_6 = (A_{6,1})X_1 + (A_{6,2})X_2 + \ldots + (A_{6,N})X_N.$$

The equation for the second set of data where the same unknown weight is positioned over, for example, load cell No. 3, is:

$$B_3 = (A_{3,1})X_1 + (A_{3,2})X_2 + \ldots + (A_{3,N})X_N.$$

If the same weight is used for both measurements then:

$B_6 = B_3$

The above equations can be simplified to:

$B_6 = (A_{6,6})X_6 + Z_6$ $B_3 = (A_{3,6})X_6 + Z_3$ where $Z_6$ is the sum of the products of the load cell outputs and position correction constants for all but the sixth load cell, and $Z_3$ is the sum of the products of the load cell outputs and the load position correction constants for all but the third load cell.

The two unknowns are $B_6$ or $B_3$, the unknown weight, and $X_6$.

Since $B_6 = B_3$, the two equations can be combined into one equation with one unknown, $X_6$, $(A_{6,6})X_6 + Z_6 = (A_{3,6})X_6 + Z_3$ rearranging, $$X_6 = \frac{Z_6 - Z_3}{(A_{3,6}) - (A_{6,6})} \quad (3)$$

The new value of $X_6$ is stored in memory for use in load position correction in the same manner as was the correction constant for the replaced load cell. In equation (3) above load cell No. 6 was used as an example of the replaced load cell and load cell No. 3 as the second position placement for the unknown weight. Any other positions and load cells would, of course, be handled in the same manner.

It should be noted that substantially similar procedures could be employed to replace two or more load cells at the same time and obtain the values of their load position correction constants. In the case of replacing two cells at the same time three weight readings would be needed and the solution to three simultaneous equations. In the case of three, four or up to all but one of the load cells being replaced, extensions of the technique described above could be employed.

Figure 13:
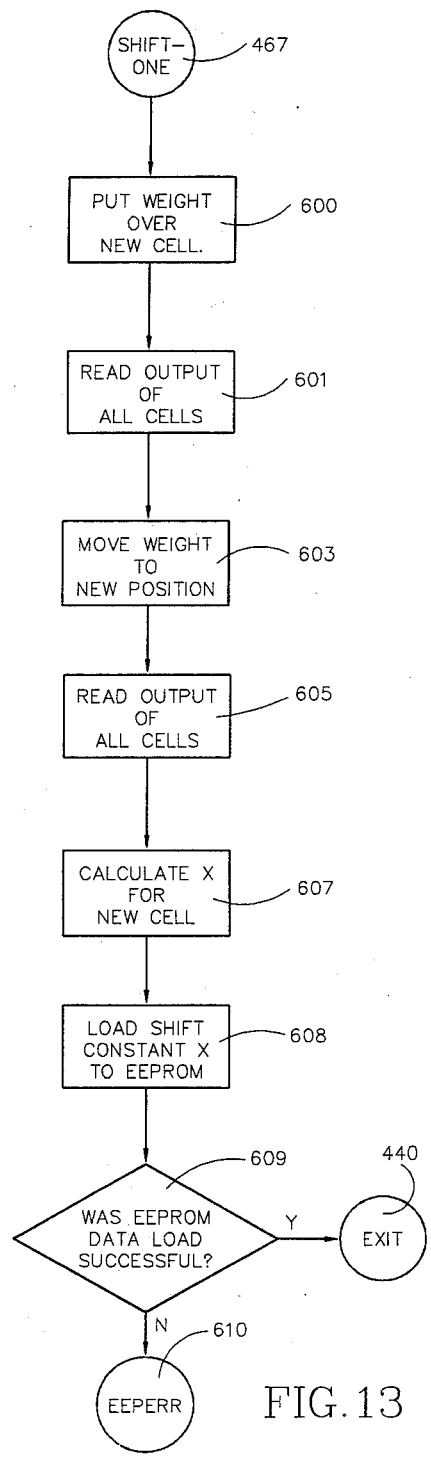
FIG. 13 is a flow chart illustrating the procedure for determining a load position correction constant for a replacement load cell in the flow chart of FIGS. 10A and 10L.

Referring now to FIG. 13, the procedure for computing the load position correction constant for a new load cell added to the scale is entered through point 467 when a key command is detected at block 461 (FIG. 10G). After entry at point 467, the unknown weight is placed over the new load cell at block 600 and the output of all load cells is read at block 601. Then, at block 603 the same unknown weight is moved to a new position and the output of all load cells again read at block 605. The load position correction constant, X, for the new load cell is calculated at block 607 from equation (3) in the manner described above and the constant is loaded into memory at block 608. If the memory load was successful as determined at block 609 operation returns through point 440 to block 442 (FIG. 10F). If the memory load was not successful operation jumps through point 610 to block 570 (FIG. 11) to cause the display the indicate a memory storage error and then proceeds through point 440 to block 442 (FIG. 10F).

What is claimed is:

1. Weighing apparatus comprising a plurality of load cells, load receiving means supported by said load cells, means associated with said load cells for providing a digital representation of a load on each load cell, means for storing a mathematical expression for load corrected for load position, and means for applying said mathematical expression to said digital load representations to produce a digital representation of the total load on said load receiving means corrected for load position.

2. Weighing apparatus as claimed in claim 1 wherein said mathematical expression includes a load position correction factor for at least one of said load cells, and wherein said correction factors are combined with the corresponding digital representations to produce corrected digital representations, and any uncorrected digital representations and said corrected digital representations are combined to produce the total load on said load receiving means corrected for load position.

3. Weighing apparatus as claimed in claim 2 including control means for receiving said digital representations from each of said load cells, combining said load position correction factors with the corresponding digital representations to produce corrected digital representations and combining the corrected digital representations and any uncorrected digital representations to produce the total load on said load receiving means corrected for load position.

4. Weighing apparatus as claimed in claim 1 wherein each load cell includes a counterforce and an analog to digital conversion means associated with the counterforce.

5. Weighing apparatus as claimed in claim 1 including control means for interrogating said load cells to receive said digital representations.

6. Weighing apparatus as claimed in claim 5 including means connecting said load cells and said control means in a local area network.

7. A method for compensating a multiple load cell scale for load position, said scale including means for providing a digital representation of a load on each load cell, the method comprising the steps of determining a mathematical expression for load corrected for load position, storing said mathematical expression, interrogating each of said load cells to receive said digital load representations, and applying said mathematical expression to said digital load representations to produce a digital representation of the total load on the scale corrected for load position.

8. A method as claimed in claim 7 wherein said mathematical expression includes a correction factor for at least one of said load cells, and including the steps of determining the load position correction factors, storing the load position correction factors, combining the load position correction factors with the respective digital load representations to provide corrected digital load representations, and combining any uncorrected digital representations and said corrected digital load representations to provide a digital representation of the total load on the scale corrected for load position.

9. A method as claimed in claim 8 wherein the step of determining the load position correction factors for each load cell includes the steps of positioning a load at different locations on said scale, determining the responses of said load cells to said load, and utilizing said responses and said mathematical expression to determine the load position correction factors.

10. A method as claimed in claim 8 including the step of determining a fresh load position correction factor for a replacement load cell and storing said fresh load position correction factor.

11. A method as claimed in claim 10 wherein said fresh load position correction factor is determined by positioning a load on said replacement load cell, obtaining digital representations from each of the load cells, positioning the same load at another location and obtaining load representations from each of the load cells, and utilizing said load representations and the known correction factors from all but the replaced load cell to determine the value of the load position correction factor for the replacement load cell, and storing said load position correction factor for the replacement load cell.

12. In a multiple digital load cell scale having a load position correction factor stored for each load cell, a method of recompensating said scale after replacement of a load cell, comprising the steps of positioning a load on the replacement load cell and obtaining load representations from each of the load cells, positioning the same load at another location and obtaining load representations from each of the load cells, utilizing said load representations and the known correction factors from all but the replaced load cell to determine the value of the load position correction factor for the replacement load cell, and storing said new load position correction factor for the replacement load cell.

13. A method as claimed in claim 12 wherein said load placed on said replacement load cell has an unknown value.

14. Weighing apparatus comprising a plurality of load cells, each load cell including a counterforce, means associated with the counterforce for providing digital representations of loads on the counterforce, and means responsive to external commands for transmitting said digital representations, load receiving means supported by said load cells, control means for interrogating said load cells to receive said digital representation, means associated with said control means for storing a predetermined load position correction factor for at least one of said load cells, means associated with said control means for combining said digital representations with corresponding ones of said load position correction factors to produce corrected digital load representations, and means for combining any uncorrected digital representations and said corrected digital load representations to produce a digital representation of the total load on said platform corrected for load position.

15. Weighing apparatus as claimed in claim 14 including means connecting said load cells and said control means in a local area network.

16. A method for compensating a multiple load cell scale for load position, said scale including means for providing a digital representation of a load on each load cell, the method comprising the steps of positioning the same load at different locations on said scale, obtaining digital load representations from each load cell at each load position, utilizing said digital load representations to determine a load position correction factor for at least one of said load cells, and storing said load position correction factor for combination with digital load representations from corresponding ones of said load cells during use of the scale.

17. A method as claimed in claim 16 wherein said load has an unknown value.

* * * * *